US009274872B1

(12) United States Patent
Chen et al.

(10) Patent No.: US 9,274,872 B1
(45) Date of Patent: Mar. 1, 2016

(54) SET-BASED BUGS DISCOVERY SYSTEM VIA SQL QUERY

(71) Applicant: EMC Corporation, Hopkinton, MA (US)

(72) Inventors: Ping Chen, Shanghai (CN); Kai Chen, Shanghai (CN); Jun Tao, Shanghai (CN); Michael John Dutch, Saratoga, CA (US); Mark Chamness, Menlo Park, CA (US); Bo Chen, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 132 days.

(21) Appl. No.: 14/040,350

(22) Filed: Sep. 27, 2013

(51) Int. Cl.
*G06F 11/00* (2006.01)
*G06F 11/07* (2006.01)

(52) U.S. Cl.
CPC ........ *G06F 11/0769* (2013.01); *G06F 11/0766* (2013.01); *G06F 11/0775* (2013.01)

(58) Field of Classification Search
CPC ............ G06F 11/0769; G06F 11/0766; G06F 11/0775; G06F 11/0781; G06F 11/0787; G06F 11/079; G06F 11/36; G06F 11/362

USPC ......... 714/26, 25, 27, 33, 37, 38.1, 38.14, 45, 714/46, 48, 57

See application file for complete search history.

(56) References Cited

U.S. PATENT DOCUMENTS

| 7,191,364 B2 * | 3/2007 | Hudson et al. ............. 714/38.11 |
| 7,644,393 B2 * | 1/2010 | Glerum et al. ................ 717/127 |
| 2003/0028825 A1 * | 2/2003 | Hines .............................. 714/37 |
| 2009/0106578 A1 * | 4/2009 | Dilman et al. .................... 714/2 |
| 2011/0154109 A1 * | 6/2011 | Levine et al. ................... 714/26 |

* cited by examiner

*Primary Examiner* — Joseph D Manoskey
(74) *Attorney, Agent, or Firm* — Van Pelt, Yi & James LLP

(57) ABSTRACT

A system for bug discovery using event reports comprises an interface and a processor. The interface is configured to receive symptom data extracted from event reports from a user system. The symptom data is stored in a symptom database. The symptom data comprises one or more symptoms each with a corresponding symptom occurrence time. The processor is configured to compose one or more SQL queries using one or more bug definitions and determine an existence of one or more bugs of the user system based at least in part on a result of querying the symptom database using the one or more SQL queries.

19 Claims, 8 Drawing Sheets

Symptom Date:
From: 2013-01-01
To: 2013-09-22
Search from 2005 to now: ☐

Bug Filters:
Domain: --All--
Component: --All--
Bug ID: 72592

Search:
Serial Number: 0F48W10528
Case Number:

Scan Symptom Data | Show All

Copy Order: Bug

| Bug ID: | Description | Fixed In (GA) | Fixed In (non-GA) | Remediation | Scan Result |
|---|---|---|---|---|---|
| 72592 | Bug 72592 - File System Outage after Drive Fai..... | 5.1.3.0 | 5.3.0.0 | 86291 | |

BUG 72592: 5 matches (The latest 5 bugs are shown)

10 Sep 2013
9 Sep 2013
13 Sep 2013
12 Sep 2013
12 Sep 2013

========== GENERAL INFO ========== (for Bug 72592)
GENERATED_ON=Sat Sep 21 22:53:08 EDT 2013
GENERATED_EPOCH_TIME=1277030795
TIME_ZONE=EDT
VERSION=4.7.3.0-140348
SYSTEM_ID=0F48W10528
SERVICE_TAG=0F48W10528

| Product | Data Domain ▼ | Software: 5.1.1.7-311422 on 2013-02-24 | | Prev | 1 | Next | ☐ Show All |

Symptom Date:                Bug Filters:                           Search:
From:   2013-01-01           Domain:    --All-- ▼                   Serial Number: 0F40341941
To:     2013-09-22           Component: --All-- ▼                   Case Number:
Search from 2005 to now: ☐   Bug ID:    58936                       Scan Symptom Data Copy Order: Bug ▼                                                                    Show All

| Bug ID: | Description | Fixed In (GA) | Fixed In (non-GA) | Remediation | Scan Result |
|---|---|---|---|---|---|
| 58936 | Bug 58936 - Phy Decoding Error on Panda (5.0.3.... | 5.1.3.0 ▼ | 5.3.0.0 ▼ | 86273 | ⊙ |

BUG 58936: 4 matches (The latest 4 bugs are shown)

5 Sep 2013
  13 Sep 2013
  14 Aug 2013
  12 Aug 2013

========== GENERAL INFO ========== (for Bug 58936)
GENERATED_ON=Sat Sep 21 23:06:25 EDT 2013
GENERATED_EPOCH_TIME=1341892926
TIME_ZONE=CEST
VERSION=5.0.2.3-259543
SYSTEM_ID=0F40341941
SERVICE_TAG=0F40341941
MODEL_NO=DD610

SET-BASED BUGS DISCOVERY SYSTEM VIA SQL QUERY

BACKGROUND OF THE INVENTION

Event reports from software and systems are used to give feedback to the developers of the software and systems when problems occur. Event reports typically contain ample information about the symptoms and state of the system at the time of the problem in order for an expert to determine and fix the problem. Typically, event reports are handled manually by technical support staff. A technical support representative combs through sometimes large amounts of data to identify the bug and cause of the system. Typically, a knowledge base of information about bugs and staff that have expert knowledge of the software and systems they run on are needed in order to discover the bug in the software and systems. Additionally sometimes, hundreds of event reports can be received in a day, making manual searching for bugs is painstaking, costly and error-prone. What is needed is an automatic and scalable way to search for bugs based on the data collected in the event reports.

BRIEF DESCRIPTION OF THE DRAWINGS

Various embodiments of the invention are disclosed in the following detailed description and the accompanying drawings.

FIG. 7A is a screen shot illustrating an embodiment of a bug report.

FIG. 7B is a screen shot illustrating an embodiment of a bug report.

DETAILED DESCRIPTION

Figure 1:
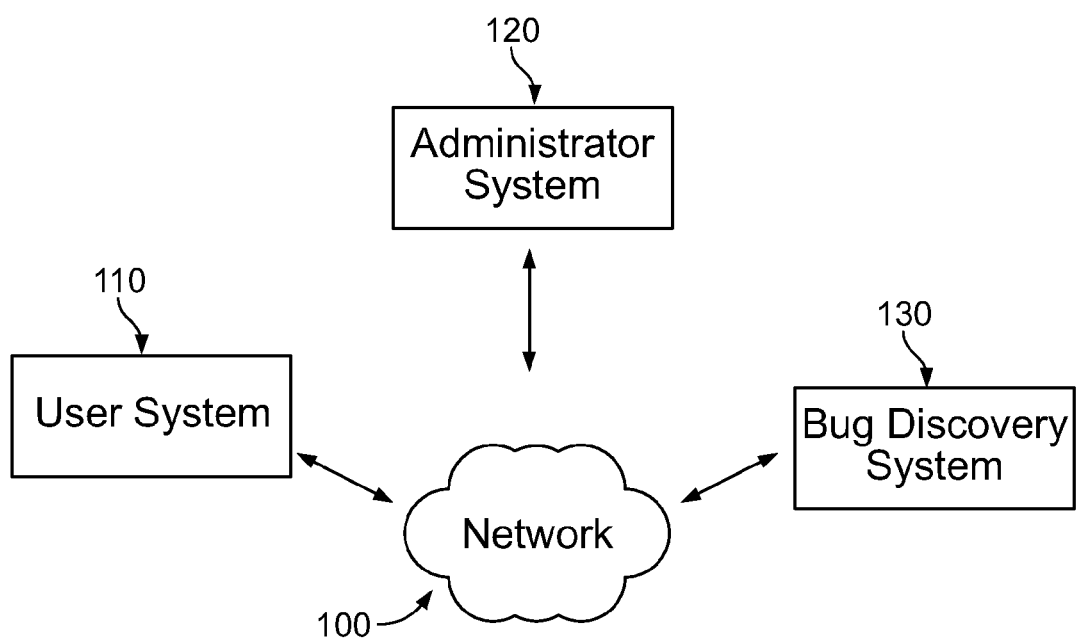
FIG. 1 is a diagram illustrating an embodiment of an environment for the bug discovery system.

The invention can be implemented in numerous ways, including as a process; an apparatus; a system; a composition of matter; a computer program product embodied on a computer readable storage medium; and/or, a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for bug discovery in event reports is disclosed. Bugs are discovered among symptom data that is extracted from event reports that are sent from a user system. The symptom data is stored in a symptom database. Symptom data includes symptoms and symptom occurrence times. A processor is configured to compose one or more SQL queries using bug definitions. The symptom database is queried using the composed one or more SQL queries. Then the processor determines the existence of one or more bugs of the user system based at least on part a result of querying the symptom database using one or more SQL queries.

In some embodiments, the symptom data comprises one or more of the following: system events, error messages, system measurements, time stamps, system environment measurements, component status, configuration settings, policy definitions, or system behaviors. In some embodiments, symptom data comprises an error message with the corresponding symptom occurrence time comprising an error time extracted from the event reports from the user system.

In some embodiments, composing the one or more structured query language (SQL) queries comprises translating the one or more bug definitions from a human-readable format to the one or more SQL queries. In some embodiments, a bug definition comprises two or more symptoms that occur with a time dependency between the two or more symptoms. In some embodiments, the bug definition is a human-readable format comprising one or more of the following: XML, JSON, or a natural language. In some embodiments, the one or more SQL queries composed using one or more bug definitions comprise a logic set operation on the symptom data. In some embodiments, the one or more SQL queries comprise a time sequence set operation on the symptom data. In some embodiments, the one or more SQL queries comprise a combination of logic set operations and time sequence set operations. In some embodiments, composing the one or more SQL queries comprises recursively composing the SQL query in the event the bug definition comprises a nested combination of other bug definitions. In some embodiments, the SQL query comprises selecting times of two symptoms where the times are within a certain time interval.

In some embodiments, determining the existence of one or more bugs comprises determining whether a result set of the SQL query from the symptom database is not empty. In some embodiments, in the event that the result set of the SQL query is not empty; the processor is configured to indicate the existence of one or more bugs of the user system. In some embodiments, the processor is further configured to, in the event that one or more bugs do exist; output a list of the one or more bugs. In some embodiments, in the event that one or more bugs do not exist, the processor is configured to indicate that the user system is healthy.

FIG. 1 is a diagram illustrating an embodiment of an environment for the bug discovery system. In the example shown, user system 110 has a malfunction or problem (e.g. a device driver failed) and sends an event report to bug discovery system 130 over network 100. In some embodiments, many user systems are connected to bug discovery system 130 through network 100 and bug discovery system 130 determines the existence of bugs in each of the user systems based on the event reports sent by the user systems.

Administrator system 120 is also connected to network 100 and is connected to user system 110 and bug discovery system 130. In some embodiments, administrator system 120 is used by technical support staff in order to find bugs in user system 110 that has sent an event report. Bug discovery system 130 automatically goes through symptom data that is sent in the event report by user system 110 to find bugs in user system 110. In some embodiments, an output of bug discovery system 130 comprises a list of one or more bugs. In some embodiments, bug discovery system 130 sends the results of the bug discovery to administrator system 120. In some embodiments, the technical support staff runs the bug discovery process on the received event reports, looks at the list of bugs as a result of the bug discovery process and responds to a user on user system 110 with the results of bug discovery system 130 (e.g. a list of bugs) and recommends actions to fix the problem on user system 110. In some embodiments, bug discovery system 130 sends the results of bug discovery to the user system. In some embodiments, network 100 is the Internet.

In some embodiments, bugs in user systems (e.g. user system 110) that cause malfunctions or problems have patterns that are represented in the event reports. The patterns are indicated by symptoms that are captured and sent to bug discovery system 130 as part of the event report. In some embodiments, the patterns are patterns of symptoms occurring in time, and can be represented on a timeline. The patterns are identified by bug discovery system 130 as bug signatures that indicate a particular bug in the user system. Bug discovery system 130 uses set operations coupled with time sequence operations on the symptoms presented in the event reports in order to determine the bug signatures or patterns in the symptom data that indicate the existence of a bug.

Figure 2:
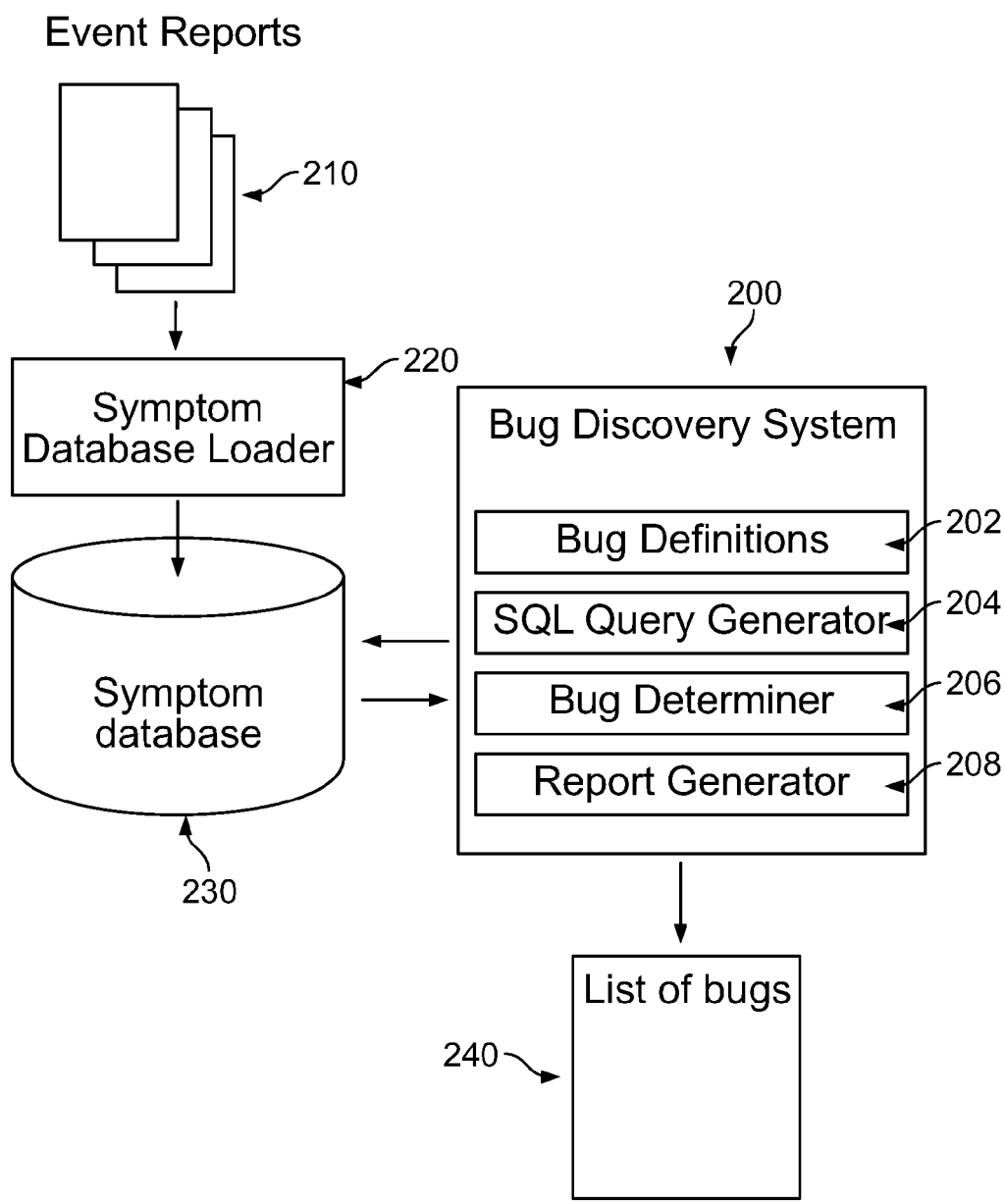
FIG. 2 is a block diagram illustrating an embodiment of the process of bug discovery for a user system that has a problem.

FIG. 2 is a block diagram illustrating an embodiment of the process of bug discovery for a user system that has a problem. In the example shown, user system (e.g. user system 110 on network 100 in FIG. 1) on a network sends event reports 210 when there is a problem or to report status. In some embodiments, event reports comprise data about the state of the user system at the time of the function (e.g. performance metrics, and system measurements). In some embodiments, event reports 210 comprise various messages or indicators of the malfunctions or problems in the system. In some embodiments, event reports are in text file format. In some embodiments, symptom data extracted from event reports comprises one or more of the following: system events, error messages, system measurements, time stamps, system environment measurements, component status, configuration settings, policy definitions, or system behaviors. In some embodiments, a symptom comprises an error message with a corresponding symptom occurrence time (e.g., an error time or a time or timestamp of the error message) extracted from the event reports from the user system. In some embodiments, symptom data comprises a time interval (e.g., a start time and an end time) of a symptom (e.g., a time interval of central processing unit (CPU) of the user system was overheating). In some embodiments, symptom data comprises a performance measurement (e.g. input-output operations per second (IOPs) for a disk drive) and an expected performance level. The expected performance level determines the level that a performance measurement is considered to be a symptom of a problem. In some embodiments, the expected performance level is dependent on the configuration of the system. For example, for a particular configuration of a user system with a certain type of CPU, the CPU is determined to overheat when the temperature is over 170 degrees C. For another configuration of a user system, the CPU is considered to be overheating when the CPU temperature is over 200 degrees C. In some embodiments, system configuration (i.e., of the user system) is also extracted from the event reports and also included in the symptom data to aid in the discovery of bugs, because the bug will depend on the type and configuration of the user system. In some embodiments, table 1 below shows example symptom data including a symptom name, a symptom source, and a description:

TABLE 1

Samples of Symptom Data

| Symptom Name | Symptom Source | Description |
| --- | --- | --- |
| device ID not available | kernel_info_log log file | certain device cannot be found (e.g., device found status is 'cannot find') |
| Test Unit Ready timeout | kernel_error_log log file | Test failed due to timeout (e.g., timeout) |
| ES30 PHY disabled | enclosure_ controller log file | Controller status is 'Noncritical' |
| CPU high temperature | cpuinfo log file | CPU temperature exceeds eighty degree |

Symptom database loader 220 loads the symptom database with symptom data extracted from event reports 210. In some embodiments, symptom database loader 220 parses the event reports received from the user system and extracts the relevant symptom data needed for bug discovery. In some embodiments, symptom database loader 210 takes unstructured data from the event reports and loads the symptom data into tables in symptom database 230. In some embodiments, symptom database loader 220 extracts the relevant symptoms from event reports 210 into fields and tables of the symptom database. In some embodiments, event reports from specific systems have a different structure and fields and parameters that are collected, therefore symptom database loader 220 extracts symptom data in ways specific to the system the event reports come from. In some embodiments, symptom database 230 stores tables of times of occurrences of relevant symptoms. For example, symptom database loader 220 extracts the times of the start and end of a CPU overloaded symptom into a table in symptom database 230. In some embodiments, symptom database loader 220 extracts performance measurements necessary to determine certain types of bugs and stores them in symptom database 230. For example, symptom database loader also extracts the CPU load percentage, memory usage, services used, temperature of the CPU during the time of the CPU overload error message.

In some embodiments, symptom database loader 220 also parses supplemental information and stores it in the symptom database. In some embodiments, supplemental information contains additional information that describes the symptom in greater detail. For example, the supplemental information determines the expected performance level. In some embodiments, supplemental information is also received along with event reports and is extracted from the event reports when the bug discovery system needs supplemental information to determine a certain bug.

Symptom database 230 stores the symptom data that is loaded by symptom database loader 220. Symptom database 230 receives SQL queries from bug discovery system 200 and sends results of the SQL queries back to the bug discovery system. In some embodiments, symptom database is a relational database. Symptom database is capable of running set operations and time sequence operations in the SQL queries sent to the symptom database.

In some embodiments, symptom database 230 is included in bug discovery system 200. In some embodiments, symptom database 230 is on the same server as bug discovery system 200. In some embodiments, symptom database 230 is on another system and is in communication with bug discovery system 200 to receive SQL queries and send back results of SQL queries. In some embodiments, symptom database loader 220 is also included in bug discovery system 200 and bug discovery system 200 loads and parses event reports into symptom database 230. In some embodiments, symptom database loader 220 is a separate system that handles incoming traffic of event reports on a large scale and loads a set of symptom data for each user system into symptom database 230. In some embodiments, symptom database loader 220 loads specific symptom databases for a bug discovery system that handles checking for bugs for a specific type of user system (e.g. all of event reports from a specific product line are loaded into a symptom database for a bug discovery system 200 that only does bug discovery for that specific product line, and only has bug definitions that are fit for the context of that product line).

In some embodiments, bug discovery system 200 determines the existence of bugs as evidenced by the event reports from the user system using bug definitions 202, SQL query generator 204, bug determiner 206, and report generator 208.

Bug definitions 202 are used to determine patterns in symptom data that indicate the presence of a bug. A bug definition characterizes a bug using symptoms and time criteria that are characteristic of a bug. In some embodiments, bug definitions are composed of two or more symptoms that occur with a time dependency between the two or more symptoms. In some embodiments, bug definitions comprise at least a symptom and a set operator that represents the interaction of a symptom with another symptom (or itself), or the set operator represents a time dependency between the symptom and another symptom. For example, a bug definition for a bug called "ioc reset," is defined to be a bug if "more than two occurrences of the error message 'ioc reset' occur within one hour."

In some embodiments, bug definitions are in a human readable format (e.g., extensible markup language (XML), javascript object notation (JSON), a natural language, etc.). For example, the sentence "more than two occurrences of the error message 'ioc reset' occur within one hour" is a natural language statement that defines a bug. In some embodiments, bug definitions are easy to compose by a technical support staff and do not require extensive programming training or knowledge. In some embodiments, bug definitions are configured by technical support staff with extensive knowledge of bugs and user systems and what symptoms indicate the presence of a particular bug. In some embodiments, bug definitions are made or refined using information obtained querying the symptom database (e.g. the bug discovery process). In some embodiments, bug definitions comprise a list of hundreds of bug definitions that pertain to many types of systems (i.e., user systems) that bug discovery system supports.

SQL query generator 204 composes SQL queries based on bug definitions 202. In some embodiments, SQL query generator 204 translates a bug definition from a human-readable format to a machine-readable SQL query. In some embodiments, SQL query generator turns a bug definition, comprising two symptoms (or a symptom with itself) and a time dependency, into an equivalent SQL query. In some embodiments, the equivalent SQL query comprises SQL commands that perform the set operation on the symptom data.

In some embodiments, each time bug discovery system is used to determine the existence of bugs; SQL queries are composed at run-time by the SQL query generator. In some embodiments, the SQL queries are generated based on the bug definitions beforehand and the SQL queries that apply for the user system being debugged are used to query the symptom database.

Bug determiner 206 determines the existence of one or more bugs of the user system based at least in part on the result of querying the symptom database using the generated SQL queries. Since the SQL queries are set operations that return a set of all entries that match the conditions of the query, bug determiner 206 determines whether a result set of the SQL query from the symptom database is not empty. In the event that the result set of SQL query is not empty, bug determiner 206 indicates the existence of one or more bugs in a user system. In some embodiments, each SQL query queries symptom database 230 for that particular bug defined by the bug definition, and therefore a non-empty set indicates that the symptoms exhibit that particular bug. In the event that the result set of the SQL query for a particular bug is an empty set (e.g. empty table) then it is indicated that that particular bug does not exist in the user system (e.g. the user system is healthy).

Report generator 208 generates an output of a list of bugs that are matched or have been found within the user system. Report generator makes list of the bugs 240 that have been indicated to exist in the user system by bug determiner 206. In some embodiments, report generator 208 also outputs statistics regarding the bug discovery process. For example, report generator also lists the total number of bugs that were in user system and the number of bugs looked for among the symptom data (e.g., the number of bug definitions or their corresponding queries that were queried in the symptom database).

Figure 3:
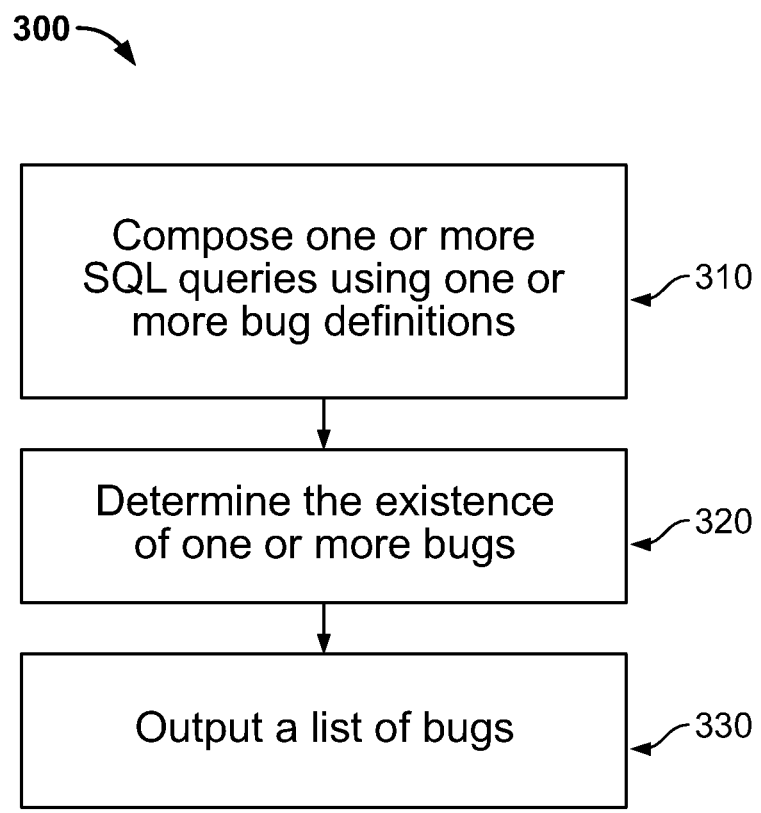
FIG. 3 is a flowchart illustrating an embodiment of a method that bug discovery system uses to determine the existence of bugs using event reports.

FIG. 3 is a flowchart illustrating an embodiment of a method that bug discovery system uses to determine the existence of bugs using event reports. In the example shown, bug discovery process 300 is used by bug discovery system (e.g. 130 in FIG. 1 or 200 in FIG. 2) to discover bugs in a user system (e.g., user system 110 of FIG. 1) using the event reports sent from user system.

At 310, one or more SQL queries using one or more bug definitions are composed. In some embodiments, SQL query generator (e.g. 204 in FIG. 2) composes the SQL queries using bug definitions (e.g., 202 in FIG. 2) in bug discovery system. In some embodiments, bug definitions are composed of two or more symptoms that occur with a time dependency between the two or more symptoms. In some embodiments, the bug definition comprises the symptoms and time dependencies that are detectable in the symptom data that comes from event reports. In some embodiments, a real bug signature is a set of all traces (or indications) of a bug that identify that bug, which include symptoms detectable in the symptom data extracted from event reports and other symptoms that are not included in the event reports.

In some embodiments, a bug definition also includes a logic set operation and/or a time sequence set operation that characterizes how the symptoms and time criteria interact with each other for that particular bug. In some embodiments, the two or more symptoms interact with each other using a set operation, where the set operation includes a logic set operation or a time sequence operation. For example, the bug called "ioc reset" has a bug definition "more than two occurrences of the error message 'ioc reset' occur within one hour" and is made up of the symptom, an "error message 'ioc reset'" and a time dependency set operation, TIMES, with the options of "more than two" and "within one hour." In some embodiments, logic set operators and time sequence operations include a time interval that they are valid for. As another example, the bug, "file system outage after drive failure," is defined by the bug definition: "more than two occurrences of the error message 'ioc reset' in one hour, which occur after an occurrence of the error message 'device ID not available' within one hour."

Table 2 lists some of the logic set operations and time sequence set operations.

TABLE 2

| Type | Operator | Description |
| --- | --- | --- |
| Logic Set Operation | AND | X & Y |
| | OR | X | Y |
| | XOR | X ⊕ Y |
| | MINUS | X − Y |
| | NOT | !X |
| Time Sequence Set Operation | AFTER | X ∩ Y is null and X is after Y with time distance "n hours" |
| | BEFORE | X ∩ Y is null and X is before Y with time distance "n hours" |
| | MEETS | X and Y both occur. Y starts when X ends |
| | STARTS | X and Y both occur. X and Y start at same time. |
| | FINISHES | X and Y both occur. X and Y finish at same time. |
| | EQUALS | X and Y both occur, they start and end at same time. |
| | OVERLAPS | X ∩ Y is not null and time interval is n hours |
| | WITHIN | X ⊆ Y |
| | TIMES | X occurs m times within n hours |

For example, a bug definition is composed of "symptom X occurring AFTER symptom Y within one hour," where symptom X and symptom Y interact with each other using the time sequence set operator AFTER. Set operations return a set of elements that are true for the conditions in the expression. EQUALS, MEETS, OVERLAPS, STARTS, FINISHES, AND, OR and XOR are commutative operations (e.g., even if the left and right operand are switched the same result is arrived at). AFTER, BEFORE, EQUALS, STARTS, FINISHES, AND, OR and XOR are associative operations (e.g., when the operations are done in different order, the results are the same, $(A\&B)\&C = A\&(B\&C)$). Since bugs are characterized by a pattern of symptoms in time, time sequence set operations are used to define bugs and are systematically translated into SQL queries. Time sequence set operations can be interpreted as calculating the Cartesian product on source sets with the according time interval related operation applied on the resulting paired symptom data.

SQL queries are composed based on the bug definitions. In some embodiments, the SQL queries are composed based on a map of operators to a SQL equivalent form. In some embodiments, an operand and set operator to SQL commands are systematically and iteratively mapped. In some embodiments, the human-readable bug definition is parsed and each symptom and operator is mapped into SQL commands. In some embodiments, the SQL commands (e.g., the SQL query) are recursively generated from bug definitions that comprise a nested combination of other bug definitions. In some embodiments, a bug definition is made of complex symptoms that characterize the bug, where the complex symptoms are combinations of other symptoms with set operations and a time criteria. For example, the bug "file system outage after drive failure" is composed of two symptoms, "more than two occurrences of the error message 'ioc reset'" and the symptom, "an occurrence of the error message 'device ID not available'." The first symptom of "more than two occurrences of the error message 'ioc reset'" is a complex symptom as it also includes a condition in the symptom "more than two times" that is the TIMES time sequence set operation. In some embodiments, when the SQL queries are translated the SQL query comprises selecting times of two symptoms from two tables of symptom occurrence times in the symptom database, where the times are within a certain time interval.

For example, the AND operator, or the AND logic set operation is translated into:

SELECT * from X
UNION
SELECT * from Y, where X and Y are from separate sources, or different tables in the symptom database. In some embodiments, X and Y are symptoms and furthermore X and Y are composed of other combinations of symptoms.

Also as another example, an expression using the AFTER operator, which is also described as "X∩y is not null and X is AFTER Y with time of 'n hours'," where X and Y are symptoms, and n is length of time, is represented in SQL as:

SELECT DISTINCT LEAST(A.tstart, B.tstart) tstart, GREATEST (A.tend, B.tend)
tend
FROM (X) A, (Y) B
WHERE (A.tstart>B.tstart AND A.tstart<B.tend AND A.tstart−B.tend<n hrs) OR (B.tstart>A.tstart AND B.tstart<A.tend AND B.tstart−A.tend<n hrs), where A and B are synonyms of symptom X and Y, respectively, and tstart is the start time and tend is the end time, and n is the length of time.

In another example, an expression using the TIMES operator or the TIMES time sequence set operation, "X occurs 2 TIMES within 1 hour," where X is a symptom and describes the repetition of symptom X twice in the time frame of 1 hour, is translated into SQL as:

SELECT p.ts1 tstart, p.ts2 tend FROM
(X') p, (X) t
WHERE
p.ts1<=t.ts AND p.ts2>=t.ts
GROUP BY p.ts1, p.ts2
HAVING
COUNT(t.ts)>=2, where X is set of occurrences of symptom X; and X' is the set of occurrences of symptom X that is in the 1 hour time window after each symptom X occurrence; ts1, ts2, respectively, is the start time and end time for each time window.

In some embodiments, the bug discovery system includes other logic set operations or time sequence set operations including NAND, NOR, ADD, or any other appropriate set operations in order to define relationships and time relationships between symptoms. The logic set operators and time sequence operators are building blocks for translating any number of bug definitions that characterize a bug into a SQL query to be used in the symptom database.

At 320, the existence of one or more bugs is determined. In some embodiments, bug discovery system runs the SQL queries that have been translated from bug definitions that pertain to a certain system to discover the existence of one or more bugs. In some embodiments, the bug discovery system queries the symptom database using the one or more composed SQL queries, which were translated from the bug definitions.

In some embodiments, the SQL queries are sent to the symptom database to be run (i.e., queries the symptom database).

In some embodiments, in the event that the output set of a SQL query for a particular bug as defined by the bug definition for that particular bug is not empty, then it is indicated that particular bug exists in the user system. In some embodiments, one SQL query and result set (e.g., result table) determines the existence of one particular bug. In some embodiments, the result set of a query is used as the input set for another SQL query and discovery of another bug. In some embodiments, bugs have names. For example, "file system outage after drive failure" is the name of a bug. In some embodiments, bugs have identifying numbers.

At 330, a list of bugs is output. In some embodiments, report generator 208 of FIG. 2 outputs the list of bugs. In some embodiments, a list of the bugs that have been found in the user system is output, as evidenced by the event reports from that user system. In some embodiments, the list of bugs includes a bug name and whether it was found in the user system or not and/or at what time. In some embodiments, only bugs that were found in the user system are listed. In some embodiments, bug identifiers (e.g., names or identifying numbers) are output in the list. In some embodiments, statistics about the bug discovery process is output.

Figure 4:
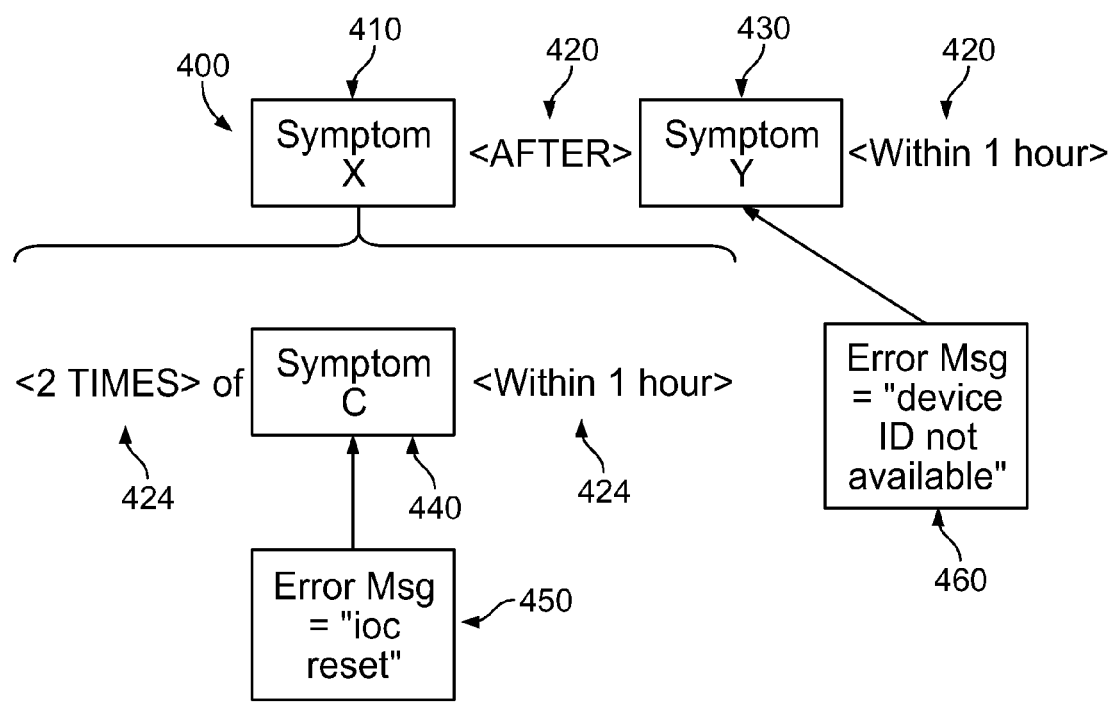
FIG. 4 is a block diagram of an example of a bug definition.

FIG. 4 is a block diagram of an example of a bug definition. In the examples shown, the bug definition is composed of other nested bug definitions and is translated by bug discovery system into an SQL query. FIG. 4 illustrates the particular bug, "file system outage after drive failure," which is defined by the bug definition: "more than two occurrences of the error message 'ioc reset' in one hour, which occur after an occurrence of the error message 'device ID not available' within one hour." In this example, bug definition 400 is the highest level of the bug definition for "file system outage after drive failure." Bug definition 400 comprises Symptom X 410 occurring AFTER (time sequence operator 420) Symptom Y 430 within 1 hour (second condition or option of time sequence operator 420). Symptom X 410 is a complex symptom made of a symptom and another set operation. Symptom X comprises Symptom C 440 being repeated 2 TIMES within 1 hour (i.e., time sequence operator 424). Symptom X represents the part of the bug definition that is "more than two occurrences of the error message 'ioc reset' in one hour." Symptom C is indicated in event reports as "Error Msg='ioc reset'" (i.e., 450). Symptom Y 430 is indicated in event reports as "Error Msg='device ID not available'" (i.e., 460).

When SQL queries are generated from the bug definition, each symptom is replaced with a corresponding SQL query that searches the symptom database for the occurrence of that symptom, and each operator is replaced with a corresponding SQL query structure. For example, for top-level bug definition 400, the corresponding SQL query skeleton for the AFTER time sequence operator (within 1 hour) is:
SELECT A.tstart tstart, B.tend tend
FROM (X) A, (Y) B
WHERE A.tstart>=B.tend AND A.tstart−CAST('1 hours' AS INTERVAL)<=B.tend, where X and Y are symptom X and Y.

The bug definition for symptom Y 430 (i.e. an error message of "Error Msg='device ID not available'" in the event reports) is translated to the following SQL query:
SELECT DISTINCT ts tstart, ts tend FROM logs
WHERE msg~'device ID not available'
SELECT DISTINCT ts tstart, ts tend FROM logs WHERE msg~'tur failed'

However, Symptom X is made of Symptom C 440 with time sequence operator 2 TIMES (within 1 hr). The pseudo-code expression "<2 TIMES> of Symptom C<Within 1 hour>" (Symptom X 410 in FIG. 4) represents the bug definition "more than two occurrences of the error message 'ioc reset' in one hour." Symptom X is made of Symptom C 440, therefore Symptom C 440 (i.e. "Error Msg='ioc reset'") is translated into SQL query:
SELECT ts FROM logs
WHERE msg~E'LogInfo\\(0x31111000\\): Originator={PL}, Code={Reset}'

The SQL query skeleton for 2 TIMES of a symptom is:
SELECT p.ts1 tstart, p.ts2 tend FROM
(X') p, (X) t
WHERE
p.ts1<=t.ts AND p.ts2>=t.ts
GROUP BY p.ts1, p.ts2
HAVING
COUNT(t.ts)>=2

Therefore, the SQL query for symptom C combined with the SQL query skeleton for 2 TIMES of a symptom, leads to the following SQL query for Symptom X:
SELECT p.ts1 tstart, p.ts2 tend FROM
(SELECT DISTINCT(ts) ts1, ts+CAST('1 hour' AS INTERVAL) ts2
FROM logs WHERE msg~E'LogInfo\\0x31111000\\): Originator={PL}, Code={Reset}') p,
(SELECT ts
FROM logs WHERE AND msg~E'LogInfo\\40x31111000\\): Originator={PL}, Code={Reset}') t
WHERE p.ts1<=t.ts AND p.ts2>=t.ts
GROUP BY p.ts1, p.ts2
HAVING COUNT(t.ts)>=2

Combining the SQL query for Symptom X with Symptom Y and in the SQL query skeleton for time sequence operation AFTER, bug definition 400 (i.e. the bug definition for "file system outage after drive failure") translated into SQL is:
SELECT A.tstart tstart, B.tend tend
FROM (SELECT p.ts1 tstart, p.ts2 tend FROM
(SELECT p.ts1 tstart, p.ts2 tend FROM
(SELECT DISTINCT(ts) ts1, ts+CAST('1 hour' AS INTERVAL) ts2
FROM logs WHERE msg~E'LogInfo\\0x31111000\\): Originator={PL}, Code={Reset}') p,
(SELECT ts
FROM logs WHERE AND msg~E'LogInfo\40x31111000\\): Originator={PL}, Code={Reset}') t
WHERE p.ts1<=t.ts AND p.ts2>=t.ts
GROUP BY p.ts1, p.ts2
HAVING COUNT(t.ts)>=2
) A,
(SELECT DISTINCT ts tstart, ts tend FROM logs WHERE msg~'tur failed') B
WHERE A.tstart>=B.tend AND A.tstart−CAST('1 hours' AS INTERVAL)<=B.tend The translated SQL query is then used to query the symptom database to determine the existence of the bug "file system outage after drive failure." If the query returns an empty set, then that bug, "file system outage after drive failure" is not in the user system.

Figure 5A:
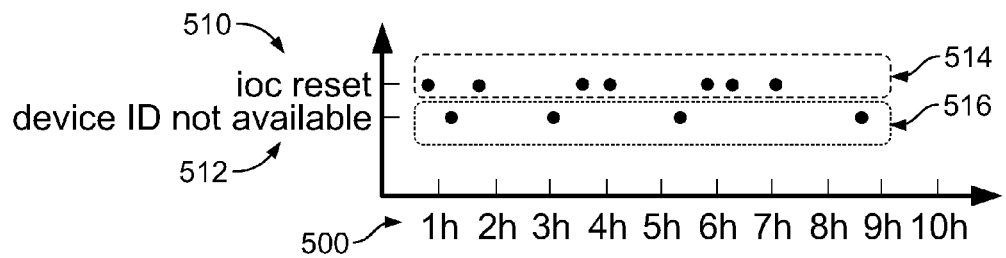
FIGS. 5A-5C are diagrams illustrating an example of discovering a bug using an example set of symptom data that has been extracted from event reports.
Figure 5B:
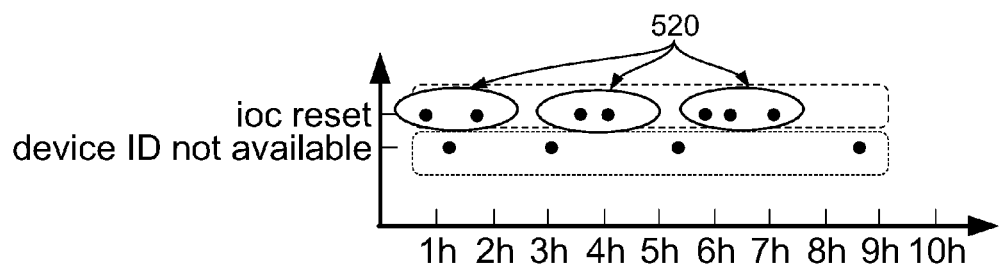
Figure 5C:
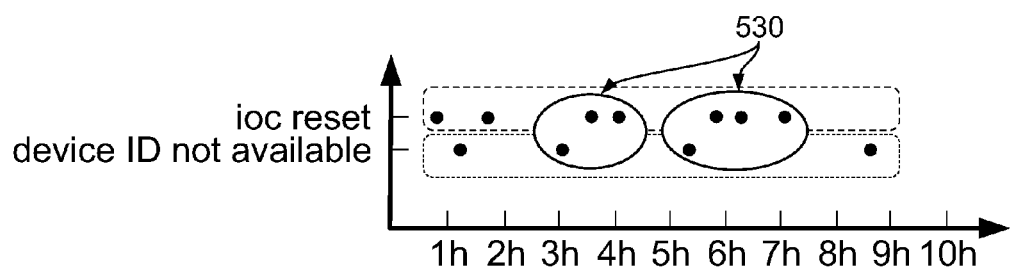

FIGS. 5A-5C are diagrams illustrating an example of discovering a bug using an example set of symptom data that has been extracted from event reports. Additionally, FIGS. 5A-5C, show symptom occurrences in time and a pattern in time (i.e., bug signature) that can be recognized by the bug discovery system as a bug. In the examples shown in FIGS. 5A-5C, the resulting set of each symptom in the bug definition of "file system outage after drive failure" (e.g. bug definition 400 and Symptom C 440, Symptom X 410 and Symptom Y 430 in FIG. 4) is illustrated in timeline form.

FIG. 5A shows timeline 500 of occurrences of symptom 510 and symptom 512. Symptom 510 is the symptom when a message "ioc reset" is present in the event reports and each dot in group 514 represents an occurrence of symptom "ioc reset" 510 on timeline 500. Symptom 512 is the symptom when a message "device ID not available" is present in the error logs of the event reports of this example symptom data. Each dot in group 516 represents an occurrence of symptom 512 on timeline 500. Using this example set of symptom data, the SQL queries for Symptoms C 440 in FIG. 4 and Symptom Y 430 in FIG. 4, would return the symptom occurrences in group 514 and group 516 respectively.

FIG. 5B shows the timeline of FIG. 5A with groups of occurrences 520 circled that represent the bug definition of symptom X (410 in FIG. 4) or the first portion of the bug definition for "file system outage after drive failure." Symptom X was described as "more than 2 occurrences of ioc reset within one hour." The SQL query for symptom X in FIG. 4 would have returned the set of occurrences, 520, as circled in FIG. 5B. In the example symptom data, there are 3 occurrences (i.e., circles 520 or circled groups of dots 520) of "more than two occurrences of the error message 'ioc reset'" in this time line of 10 hours.

FIG. 5C shows the timeline of FIG. 5A with the pattern of occurrences that match the bug definition of "file system outage after drive failure." Circles 530 highlight the groups of occurrences that correspond to the bug definition "more than two occurrences of the error message 'ioc reset' in one hour, which occur after an occurrence of the error message 'device ID not available'." For the example set of symptom data and this bug definition, the pattern of occurrences of symptoms in time (i.e., the dots in a particular sequence on a timeline) is the bug signature of this bug definition. The SQL query for the bug definition "file outage after drive failure," which was translated from bug definition 400 of FIG. 4 would have returned the bugs highlighted in circles 530 using this example set of symptom data. In this example set of symptom data, two occurrences of the bug "file system outage after drive failure" were found (e.g., circles 530). The first group of dots does not match the bug definition because although there are two or more occurrences of 'ioc reset' they are not both after the error message "device ID not available."

In some embodiments, the bug "Phy Decoding Error on Panda" has the following definition: two events "PHY Decoding Error for phy" and "No workaround, but ATTENTION" both occur in half an hour. For this bug, first the SQL query is constructed for the occurrences of "PHY Decoding Error for phy" and "No workaround, but ATTENTION" which are bug symptoms. The two SQL queries are as follows:
  SQL query for "PHY Decoding Error for phy".
  SELECT DISTINCT ts tstart, ts tend FROM logs
  WHERE msg~'PHY Decoding Error for phy'
  SQL query for "No workaround, but ATTENTION"
  SELECT DISTINCT ts tstart, ts tend FROM logs
  WHERE msg~'No workaround, but ATTENTION'

Besides the SQL query for the bug symptoms, another set operation: "AFTER" needs to be used to join and set condition on the bug symptoms to construct the complete SQL query for the bug signature. The skeleton of the SQL query to search the bug is constructed as follows:
  SELECT A.tstart tstart, B.tend tend
  FROM (X) A, (Y) B WHERE (A.tstart<=B.tend AND A.tstart−CAST('30 seconds' AS INTERVAL)<=B.tend) OR (B.tstart<=A.tend AND B.tend−CAST('30 seconds' AS INTERVAL) <=A.tstart)
  X is the SQL query for the event of "PHY Decoding Error for phy";
  Y is the SQL query for the event of "No workaround, but ATTENTION";

The two symptom sets X "PHY Decoding Error for phy", and Y "No workaround, but ATTENTION" are abstracted. "CAST ('30 seconds' AS INTERVAL)" is the postgresql API to represent half an hour time interval. The SQL query for searching the two symptom sets X and Y are shown below:
  X: SQL query for "PHY Decoding Error for phy";
  SELECT DISTINCT ts tstart, ts tend FROM logs WHERE msg~'PHY Decoding Error for phy'
  Y: SQL query for "No workaround, but ATTENTION";
  SELECT DISTINCT ts tstart, ts tend FROM logs WHERE msg~'No workaround, but ATTENTION'

By replacing X, Y with the corresponding SQL query, the complete SQL query in is arrived at for the bug "Phy Decoding Error on Panda":
  SELECT A.tstart tstart, B.tend tend
  FROM (
  SELECT DISTINCT ts tstart, ts tend FROM logs
  WHERE msg~'PHY Decoding Error for phy'
  ) A, (
  SELECT DISTINCT ts tstart, ts tend FROM logs
  WHERE msg~' No workaround, but ATTENTION'
  ) B
  WHERE (A.tstart<=B.tend AND A.tend−CAST('30 seconds' AS INTERVAL)<=B.tstart) OR (B.tstart<=A.tend AND B.tend−CAST('30 seconds' AS INTERVAL) <=A.tstart)

Figure 6:
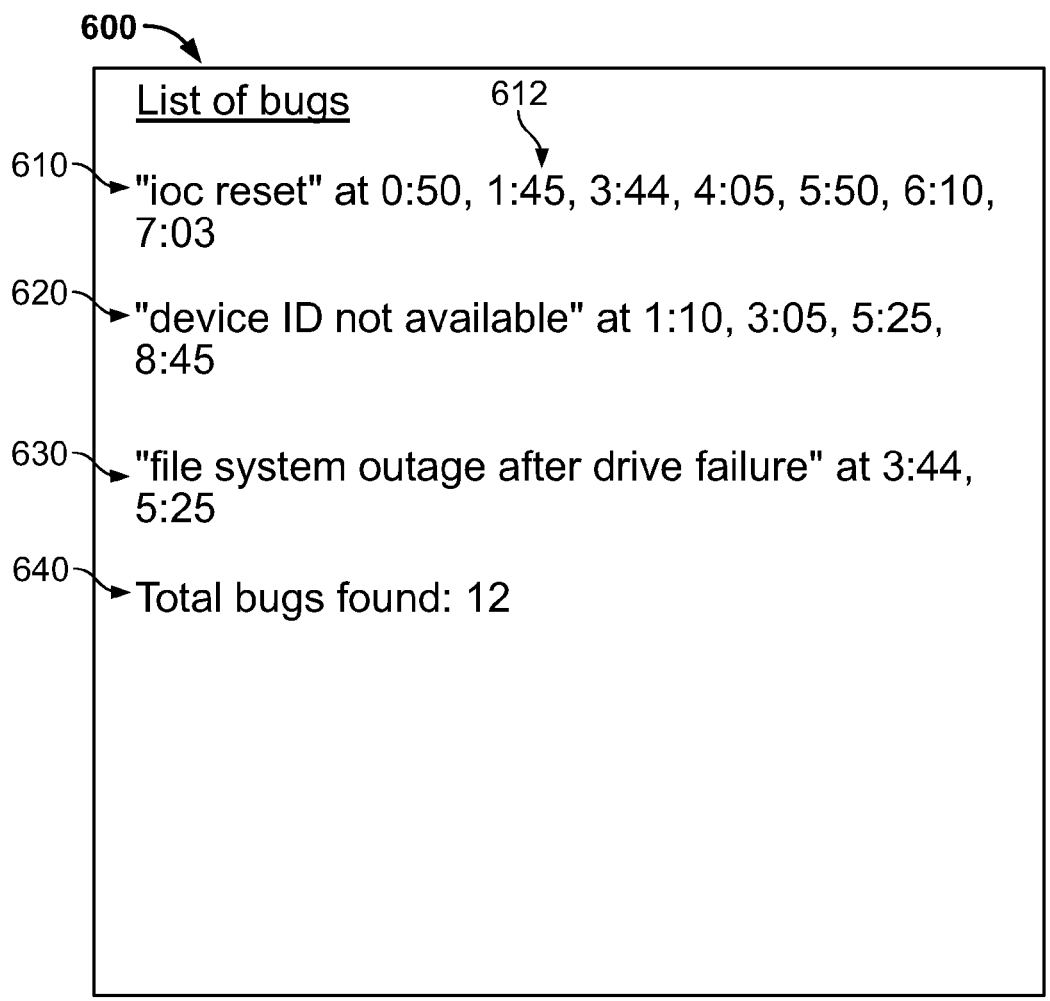
FIG. 6 is a diagram illustrating an embodiment of a list of bugs output by bug discovery system.

FIG. 6 is a diagram illustrating an embodiment of a list of bugs output by bug discovery system. In the example shown, list of bugs 600 is example of list of bugs 240 output by bug discovery system 200 in FIG. 2 or at 330 in process 300 in FIG. 3. For example, list of bugs 600 is an example of the output of bug discovery system for the example set of symptom data from FIG. 5A-5C.

In some embodiments, list of bugs 600 includes bug "ioc reset" 610, bug "device ID not available" 620, and bug "File system outage after drive failure" 630. In some embodiments, list of bugs 600 includes a list of bug identifiers (e.g., a name, or identifying number). In some embodiments, list of bugs 600 also lists the occurrences of each bug. For example, bug 610 "ioc reset" is followed by list 612 of each occurrence of this bug in the user system, which occurs at 0:50, 1:45, 3:44, 4:05, 5:50, 6:10, and 7:03 hrs. In some embodiments, each occurrence includes the date and time of the occurrence in the user system (e.g., on May 5, 2013 at 4:42 PM). Bug 620, "device ID not available" is followed by a list of occurrence times of that bug (i.e., at 1:10, 3:05, 5:25, 8:45). The occurrence time list corresponds to the dots on the timeline in FIGS. 5A-5C.

In some embodiments, occurrences of symptoms are also occurrences bugs that are listed in the list of bugs. In some embodiments, only bugs with bug definitions are listed (e.g., only 630 and the bug "file system outage after drive failure") and the occurrence times of the bug are listed. In some embodiments, list of bugs also includes statistics about the bugs found in the user system. For example, in list of bugs 600, total bugs found 640 is 12 for the example set of symptom data. In various embodiments, list of bugs also includes number of different types of bugs, total number of bugs tested, total number of bug definitions for a particular type of user system, start and end times of a bug, duration of a bug or symptom, other performance measurements related to the bug, configuration of the user system, or any other information relating to bugs.

In some embodiments, a list of bugs includes a bug definition (e.g., name of the bug definition) and whether the bug was present in the user system. In some embodiments, a list of bugs output by bug discovery system includes a list of symptoms found and a list of bugs found. In some embodiments, bug discovery system outputs a list of symptoms and occurrence times of each symptom and a list of bug definitions associated with those symptoms.

FIG. 7A is a screen shot illustrating an embodiment of a bug report. In the example shown, symptom data scan is specified using a symptom date range (e.g., from date to a date, or from a start date to the present, etc.), using bug filters (e.g., a domain filter, a component filter, a bug ID (for example, 72592), etc.), with a search identifier (e.g., serial number, case number, etc.), or any other appropriate scan parameter. The scan result for bug ID 72592 'file system outage after drive failure is found at 5 times (e.g., 10 Sep. 2013, 9 Sep. 2013, 13 Sep. 2013, 12 Sep. 2013, 12 Sep. 2013, etc.).

FIG. 7B is a screen shot illustrating an embodiment of a bug report. In the example shown, symptom data scan is specified using a symptom date range (e.g., from date to a date, or from a start date to the present, etc.), using bug filters (e.g., a domain filter, a component filter, a bug ID (for example, 58936), etc.), with a search identifier (e.g., serial number, case number, etc.), or any other appropriate scan parameter. The scan result for bug ID 58936 Phy decoding error on panda is found at 4 times (e.g., 5 Sep. 2013, 13 Sep. 2013, 14 Sep. 2013, 14 Sep. 2013, etc.).

Although the foregoing embodiments have been described in some detail for purposes of clarity of understanding, the invention is not limited to the details provided. There are many alternative ways of implementing invention. The disclosed embodiments are illustrative and not restrictive.

What is claimed is:

1. A system for bug discovery using event reports, comprising:
    an interface configured to:
        receive symptom data extracted from event reports from a user system, wherein the symptom data is stored in a symptom database, and wherein the symptom data comprises one or more symptoms each with a corresponding symptom occurrence time;
    a processor configured to:
        compose a SQL query using a bug definition, wherein the SQL query comprises commands mapped from each of the one or more symptoms and an operator in the bug definition;
        query the symptom database using the SQL query;
        determine an existence of the bug in the user system based at least in part on a result of querying the symptom database.

2. A system as in claim 1, wherein the symptom data comprises one or more of the following: system events, error messages, system measurements, time stamps, system environment measurements, component status, configuration settings, policy definitions, or system behaviors.

3. A system as in claim 1, wherein each of the one or more symptoms comprises an error message with the corresponding symptom occurrence time comprising an error time extracted from the event reports from the user system.

4. A system as in claim 3, wherein the symptom data comprises one or more of the following: CPU temperature, CPU load, driver messages, device found status, timeout, and controller status.

5. A system as in claim 1, wherein the bug definition comprises a logic set operation on the symptom data, wherein the logic set operation comprises one of the following: AND, OR, XOR, MINUS, NOT, NAND, NOR or ADD.

6. A system as in claim 1, wherein the bug definition comprises a time sequence set operation on the symptom data.

7. A system as in claim 6, wherein the time sequence set operation comprises one of the following: AFTER, BEFORE, MEETS, STARTS, FINISHES, EQUALS, OVERLAPS, WITHIN, or TIMES.

8. A system as in claim 1, wherein the bug definition comprises a combination of logic set operations and time sequence set operations on the symptom data.

9. A system as in claim 1, wherein the determining the existence of the one or more bugs comprises determining whether a result set of the SQL query from the symptom database is not empty.

10. A system as in claim 9, wherein determining the existence of the one or more bugs further comprises indicating the existence of the one or more bugs of the user system in the event that the result set of the SQL query is not empty.

11. A system as in claim 1, further comprising a processor configured to, in the event that the one or more bugs do exist, output a list of the one or more bugs.

12. A system as in claim 1, further comprising a processor configured to, in the event that the one or more bugs do not exist, indicate that the user system is healthy.

13. A system as in claim 1, wherein the bug definition comprises two or more symptoms that occur with a time dependency between the two or more symptoms.

14. A system as in claim 1, wherein the bug definition is a human-readable format comprising one or more of the following: XML, JSON, or a natural language.

15. A system as in claim 1, wherein composing the one or more SQL queries comprises translating the one or more bug definitions from a human-readable format to the one or more SQL queries.

16. A system as in claim 1, wherein the SQL query comprises selecting times of two symptoms from two tables of symptom occurrence times in the symptom database, wherein the selected times are within a certain time interval.

17. A system as in claim 1, wherein composing the one or more SQL queries comprises recursively composing the SQL query in the event the bug definition comprises a nested combination of other bug definitions.

18. A method for bug discovery using event reports, comprising:
    composing a SQL query using a bug definition, wherein the SQL query comprises commands mapped from each of the one or more symptoms and an operator in the bug definition;
    querying the symptom database using the SQL query;
    determining, using a processor, an existence of the bug in the user system based at least in part on a result of querying a symptom database, wherein symptom data is stored in the symptom database, wherein the symptom data is extracted from event reports from a user system and wherein the symptom data comprises one or more symptoms each with a corresponding symptom occurrence time.

19. A computer program product for bug discovery using event reports, the computer program product being embodied in a non-transitory computer readable storage medium and comprising computer instructions for:
- receiving symptom data extracted from event reports from a user system, wherein the symptom data is stored in a symptom database, and wherein the symptom data comprises one or more symptoms with one or more symptom occurrence times;
- composing a SQL query using a bug definition, wherein the SQL query comprises commands mapped from each of the one or more symptoms and an operator in the bug definition;
- querying the symptom database using the SQL query;
- determining an existence of the bug in the user system based at least in part on a result of the SQL query of the symptom database.

\* \* \* \* \*